(12) United States Patent
Moroi et al.

(10) Patent No.: US 11,009,869 B2
(45) Date of Patent: May 18, 2021

(54) AUTONOMOUSLY NAVIGATING VEHICLE

(71) Applicant: HONDA MOTOR CO., LTD., Tokyo (JP)

(72) Inventors: Atsushi Moroi, Wako (JP); Yuki Matsui, Wako (JP); Kohei Matsuzawa, Wako (JP); Takahide Konchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 336 days.

(21) Appl. No.: 16/317,310

(22) PCT Filed: Oct. 31, 2016

(86) PCT No.: PCT/JP2016/082344
§ 371 (c)(1),
(2) Date: Jan. 11, 2019

(87) PCT Pub. No.: WO2018/078880
PCT Pub. Date: May 3, 2018

(65) Prior Publication Data
US 2019/0235495 A1 Aug. 1, 2019

(51) Int. Cl.
*G05D 1/00* (2006.01)
*G05D 1/02* (2020.01)
(Continued)

(52) U.S. Cl.
CPC ......... *G05D 1/0055* (2013.01); *A01D 34/008* (2013.01); *A01D 34/63* (2013.01);
(Continued)

(58) Field of Classification Search
CPC .. G05D 1/0055; G05D 1/0227; G05D 1/0259; G05D 1/0265; G05D 2201/0208;
(Continued)

(56) References Cited

U.S. PATENT DOCUMENTS

| 2005/0171639 A1 | 8/2005 | Uehigashi et al. |
| 2015/0185733 A1 | 7/2015 | Jägenstedt et al. |
| 2016/0109241 A1 | 4/2016 | Eguchi et al. |

FOREIGN PATENT DOCUMENTS

| JP | 2006-338580 A | 12/2006 |
| JP | 2016-81434 A | 5/2016 |

(Continued)

OTHER PUBLICATIONS

International Search Report, issued in PCT/JP2016/082344, dated Dec. 6, 2016.

*Primary Examiner* — Michael D Lang
(74) *Attorney, Agent, or Firm* — Birch, Stewart, Kolasch & Birch, LLP

(57) ABSTRACT

In an autonomously navigating vehicle including a sensor (contact-lift sensor) configured to produce an output proportional to displacement between a chassis and the cover and the control unit configured to receive output of the sensor, wherein the control unit is configured to determine whether change of the sensor output per prescribed time period is equal to or greater than the threshold value, count up time period during which change has been determined to be equal to or greater than the threshold value, and compare time period counted up by the time integration unit with prescribed time periods (first prescribed time period and second prescribed time period) and discriminate whether the vehicle has contacted an obstacle or whether the cover has been lifted from the chassis based on the result of the comparison with the prescribed time periods.

20 Claims, 3 Drawing Sheets

(51) Int. Cl.
*A01D 34/00* (2006.01)
*A01D 34/63* (2006.01)
*A01D 101/00* (2006.01)

(52) U.S. Cl.
CPC ......... *G05D 1/0227* (2013.01); *G05D 1/0259* (2013.01); *A01D 2101/00* (2013.01); *G05D 1/0265* (2013.01); *G05D 2201/0208* (2013.01)

(58) Field of Classification Search
CPC ... A01D 34/008; A01D 34/63; A01D 2101/00
See application file for complete search history.

(56) References Cited

FOREIGN PATENT DOCUMENTS

| | | |
|---|---|---|
| WO | WO 2013/125995 A1 | 8/2013 |
| WO | WO 2014/007728 A1 | 1/2014 |
| WO | WO 2015/115954 A1 | 8/2015 |

AUTONOMOUSLY NAVIGATING VEHICLE

TECHNICAL FIELD

This invention relates to an autonomously navigating vehicle.

BACKGROUND ART

As an autonomously navigating vehicle is known a vehicle that comprises a chassis, a cover displaceably attached to the chassis and a sensor for producing an output proportional to displacement between the chassis and the cover, and that runs autonomously on drive wheels attached to the chassis. As an example can be cited the technology of Patent Document 1.

An autonomously navigating vehicle of this type is ordinarily equipped with a contact sensor for detecting contact with buildings, paving stones, animals, people or other obstacles and with a lift sensor for detecting upward lift of the cover from the chassis by a user, for example.

PRIOR ART DOCUMENT

Patent Document

Patent Document 1: Japanese Unexamined Patent Publication No. 2016-81434A

SUMMARY OF THE INVENTION

Problem to be Solved by the Invention

Although the provision of two types of sensors according to the technology Patent Document 1 ensures reliable obstacle and cover lift detection, the provision of two types of sensors complicates its configuration.

The object of this invention is therefore to overcome this problem by providing an autonomously navigating vehicle that detects obstacles and cover lift with a single type of sensor.

Means for Solving the Problem

In order to overcome the problem, this invention provides an autonomously navigating vehicle, which comprises: a chassis, a cover displaceably attached to the chassis, a sensor configured to produce an output proportional to displacement between the chassis and the cover, and a control unit configured to receives output of the contact-lift sensor, wherein the vehicle is configured to navigate autonomously on drive wheels attached to the chassis, characterized in that: the control unit comprises; a sensor output determination unit configured to determine whether change of the sensor output per prescribed time period is equal to or greater than a threshold value, a time integration unit configured to count up time period during which change has been determined by the sensor output determination unit to be equal to or greater than the threshold value, and a discrimination unit configured to compare time period counted up by the time integration unit with prescribed time periods and discriminate whether the vehicle has contacted an obstacle or whether the cover has been lifted from the chassis based on the result of the comparison with the prescribed time periods.

Effects of the Invention

In the autonomously navigating vehicle according to the present invention, it comprises, a chassis, a cover displaceably attached to the chassis, a sensor configured to produce an output proportional to displacement between the chassis and the cover, and a control unit configured to receives output of the contact-lift sensor, wherein the control unit comprises; a sensor output determination unit configured to determine whether change of the sensor output per prescribed time period is equal to or greater than a threshold value, a time integration unit configured to count up time period during which change has been determined by the sensor output determination unit to be equal to or greater than the threshold value, and a discrimination unit configured to compare time period counted up by the time integration unit with prescribed time periods and discriminate whether the vehicle has contacted an obstacle or whether the cover has been lifted from the chassis based on the result of the comparison with the prescribed time periods, whereby contact with an obstacle and lift of the cover can be detected with one type of sensor and the configuration can be simplified compared with a configuration requiring two sensors.

MODE FOR CARRYING OUT THE INVENTION

Figure 1:
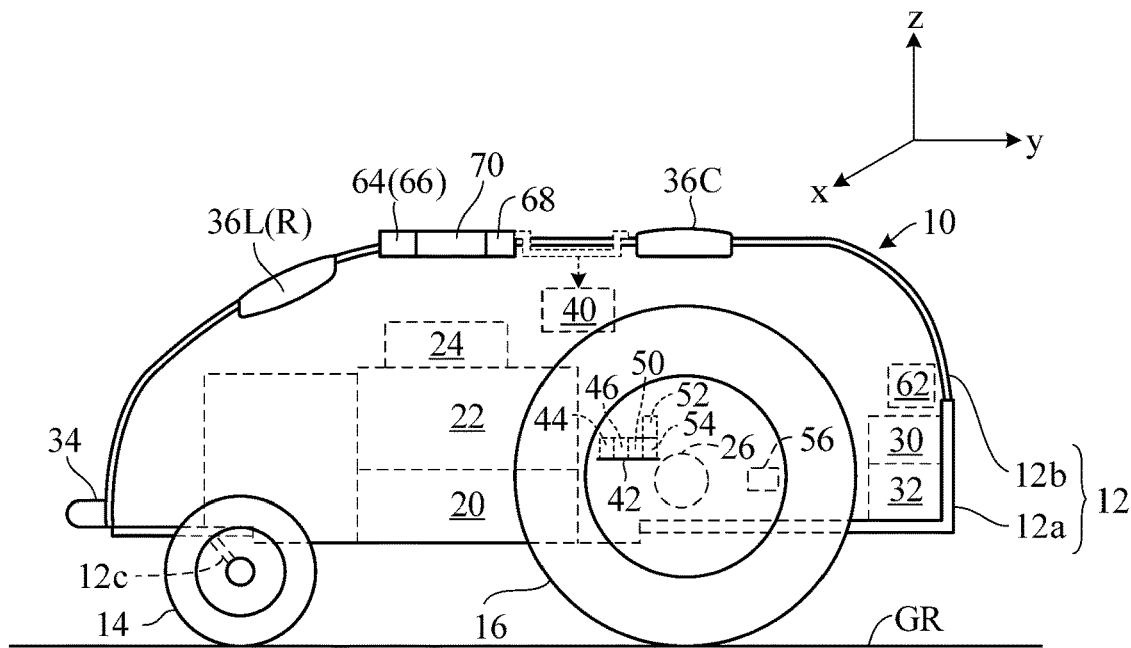
FIG. 1 is a conceptual diagram showing an overview of an autonomously navigating vehicle in accordance with this invention.
Figure 2:
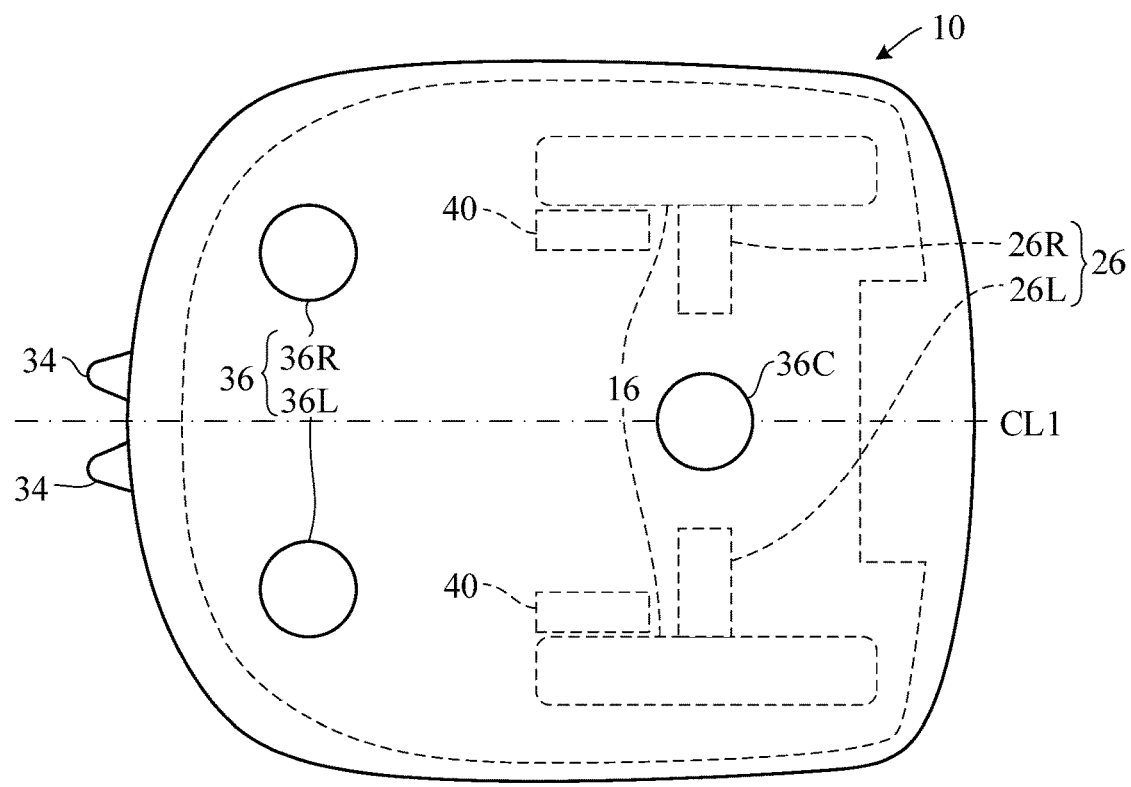
FIG. 2 is a top view of the autonomously navigating vehicle of FIG. 1.
Figure 3:
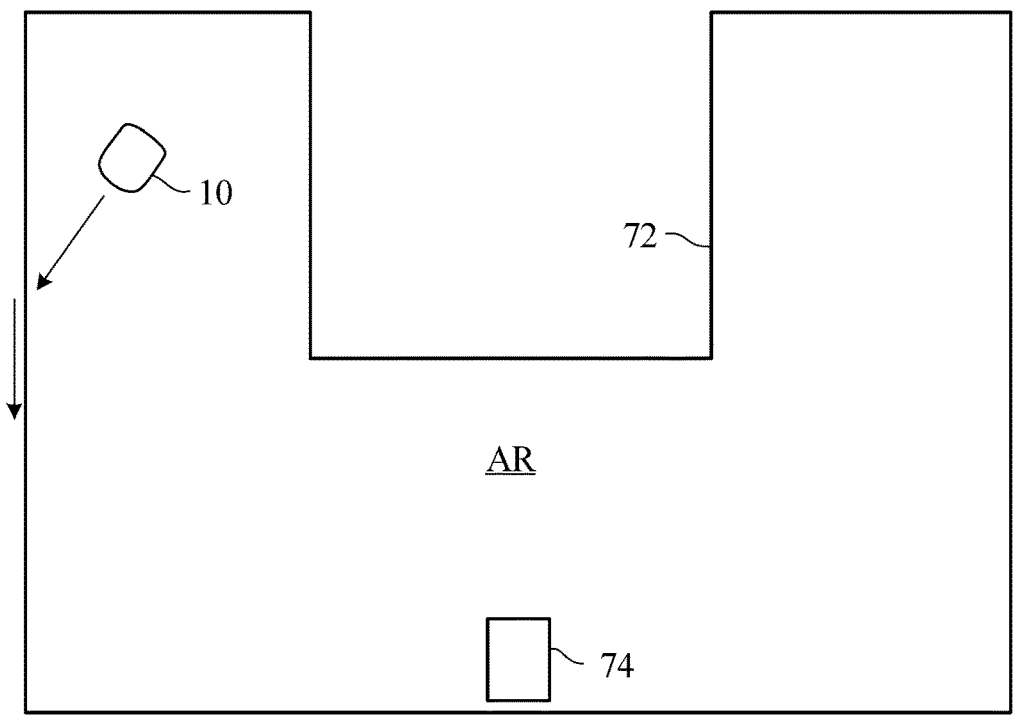
FIG. 3 is a plan view of a working area navigated by the autonomously navigating vehicle of FIG. 1.

FIG. 1 is a conceptual diagram showing an overview of an autonomously navigating vehicle in accordance with this invention; FIG. 2 is a top view of the autonomously navigating vehicle of FIG. 1; and FIG. 3 is a plan view of a working area navigated by the autonomously navigating vehicle of FIG. 1.

Reference number 10 appearing in FIG. 1 and other drawings designates an autonomously navigating vehicle (hereinafter called "vehicle"). The vehicle 10 is actually implemented as a lawnmower. A body 12 of the vehicle 10 comprises a chassis (body frame) 12a and a cover 12b displaceably attached to the chassis.

The vehicle 10 is equipped with two front wheels 14 of relatively small diameter fixed by stays 12c to left and right sides of the chassis 12a toward its front end in the forward-rearward direction, and with left and right rear wheels 16 of relatively large diameter directly attached to the chassis 12a toward its rear end.

A lawnmower work unit (blade, specifically rotary blade) 20 is attached to near the middle part of the chassis 12a of the vehicle 10, and an electric motor (prime mover; hereinafter called "work motor") 22 is installed above the work unit 20. The work unit 20 is connected to the work motor 22 and is rotationally driven by the work motor 22.

A work unit height regulating mechanism 24 manually operable by a user is connected to the work unit 20. The work unit height regulating mechanism 24 is equipped with a handle and configured to enable the user to regulate vertical height of the work unit 20 from ground surface GR by manually turning the handle.

Two electric motors (prime movers; hereinafter called "propulsion motors") 26L and 26R are attached to the chassis 12a of the vehicle 10 rearward of the work unit 20. The propulsion motors 26L and 26R are connected to the left and right rear wheels 16 and, with the front wheels 14 operating as free wheels, the rear wheels 16, operating as driven wheels, are rotated independently on the left and right sides either normally (rotate to move forward) or reversely (rotate to move backward). The work unit 20, work motor 22, propulsion motors 26 and other components are covered by the cover 12b.

In this embodiment, the vehicle 10 is of such weight and size as to be portable by the user. For example, the vehicle 10 has a total length (forward-rearward direction length) of about 71 cm, total width of about 55 cm, and height of about 30 cm.

An onboard charging unit 30 and an onboard battery 32 connected thereto are housed at the rear of the utility vehicle 10, and two battery charging terminals 34 are attached to the chassis 12a so as to project forward from a front end position. The battery charging terminals 34 are connected to the onboard charging unit 30. The work motor 22 and propulsion motors 26 are also connected to and powered by the onboard battery 32.

Left and right magnetic sensors 36L and 36R are installed toward the front end of the body 12 of the vehicle 10 and a single magnetic sensor 36C is installed toward the rear end. The magnetic sensors 36 output signals indicating magnetic field strength.

A contact-lift sensor 40 is attached to the body 12 to detect contact of the vehicle 10 with buildings, paving stones, people and other obstacles and to detect upward lift of the cover 12b from the chassis 12a by the user, for example. The contact-lift sensor 40 is explained in detail below.

A housing box installed near the middle of the chassis 12a houses a printed circuit board 42 carrying an electronic control unit (control unit; hereinafter called "ECU") 44, which comprises a microcomputer equipped with a CPU, I/O, memory (ROM, EEPROM and RAM) and other components.

The printed circuit board 42 is provided thereon, in the vicinity of the ECU 44, with an angular velocity sensor 46 that generates an output indicating angular velocity (yaw rate) about a center-of-gravity z-axis (gravity axis) of the vehicle 10, an acceleration sensor 50 that generates an output indicating acceleration acting on the vehicle 10 in orthogonal three-axis (x, y and z) directions, a direction sensor 52 that generates an output indicating absolute orientation in response to terrestrial magnetism, and a GPS sensor 54 that receives radio waves from GPS satellites and generates an output indicting current position of the vehicle 10.

Wheel speed sensors 56 that generate outputs indicating wheel speeds of the left and right rear wheels 16 are installed near the left and right rear wheels 16 of the vehicle 10. A current sensor 62 that generates an output indicating consumption of onboard battery 32 current is installed on the onboard battery 32.

The utility vehicle 10 is equipped with a main switch 64 for instructing start of work operation and an emergency stop switch 66 for instructing emergency stop, both of which are operable by the operator. In addition, the top of the cover 12b has a large cutaway in which a keyboard, touch panel or other input device 68 is installed for input of instructions and the like by the user, and a display 70 is installed near the input device 68. The input device 68 and the display 70 are connected to the ECU 44, and the display 70 displays working mode and various other information in accordance with instructions from the ECU 44.

Outputs of the magnetic sensors 36, contact-lift sensor 40, angular velocity sensor 46 and other sensors, and the outputs of the main switch 64 and other switches are sent to the ECU 44. Based on these outputs, the ECU 44 applies power from the onboard battery 32 to the propulsion motors 26 and outputs control values to control navigation of the vehicle 10 by controlling operation of the propulsion motors 26.

The ECU 44 detects (recognizes) a working area AR from the outputs of the magnetic sensors 36 and accordingly applies power to the work motor 22 so as to service the working area AR.

As shown in FIG. 3, the working area AR is delineated by a boundary wire (electrical wire) 72 laid around its periphery (boundary). A charging station 74 is installed in the working area AR for charging the onboard battery 32 of the vehicle 10. (In FIG. 3, sizes of the vehicle 10 and so on are exaggerated.)

A characterizing feature of this invention resides in the ECU 44 detecting (determining) from input received from the contact-lift sensor 40 whether the vehicle 10 has contacted an obstacle or whether the cover 12b has been lifted from the chassis 12a. This feature is explained with reference to FIG. 4 and ensuing drawings in the following.

Figure 4:
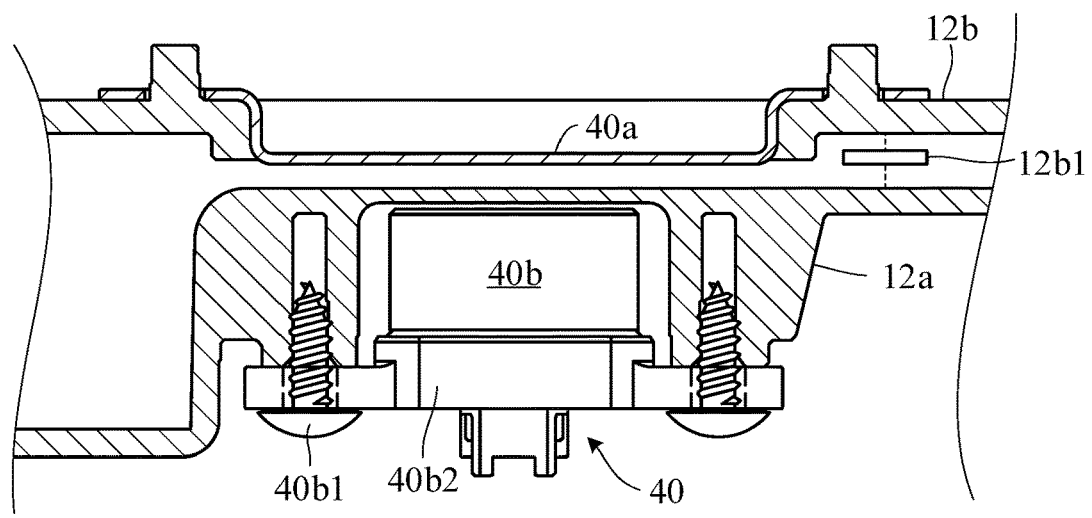
FIG. 4 is a schematic cross-sectional diagram of the vicinity where the contact-lift sensor of FIG. 1 is attached.

The contact-lift sensor 40 will be explained first. FIG. 4 is a schematic cross-sectional diagram of the vicinity where the contact-lift sensor 40 is attached.

As illustrated, the contact-lift sensor 40 according to this embodiment is installed between the chassis 12a and the cover 12b displaceably attached to the chassis 12a through a locking member 12b1.

More concretely, the contact-lift sensor 40 comprises a magnetic body 40a installed near the cover 12b and a detection unit 40b incorporating a Hall effect element or other magnetic sensitive element and installed on the chassis 12a. In the contact-lift sensor 40, the detection unit 40b produces and output proportional to distance to the magnetic body 40a, i.e., displacement between the chassis 12a and the cover 12b.

The magnetic body 40a is made of iron or other ferromagnetic material and, as shown in FIG. 1, is installed immediately under the cover 12b. The detection unit 40b is housed in a case 40b2 fastened to the chassis 12a by screws 40b1 at a position a certain distance away from the magnetic body 40a. The chassis 12a and cover 12b are made of synthetic resin material.

As shown in FIG. 2, one contact-lift sensor 40 is installed on either side of a vehicle axis CL1 lying parallel to running direction of the vehicle 10.

The ECU 44 receives output from the contact-lift sensor 40 and uses this output from a single type of (single unit) contact-lift sensor 40 to detect (discriminate) whichever of contact with an obstacle and lift of the cover 12b. (Specifically, as discussed later, the ECU 44 functions as an output determination unit, a time integrator and a discrimination unit).

Figure 5:
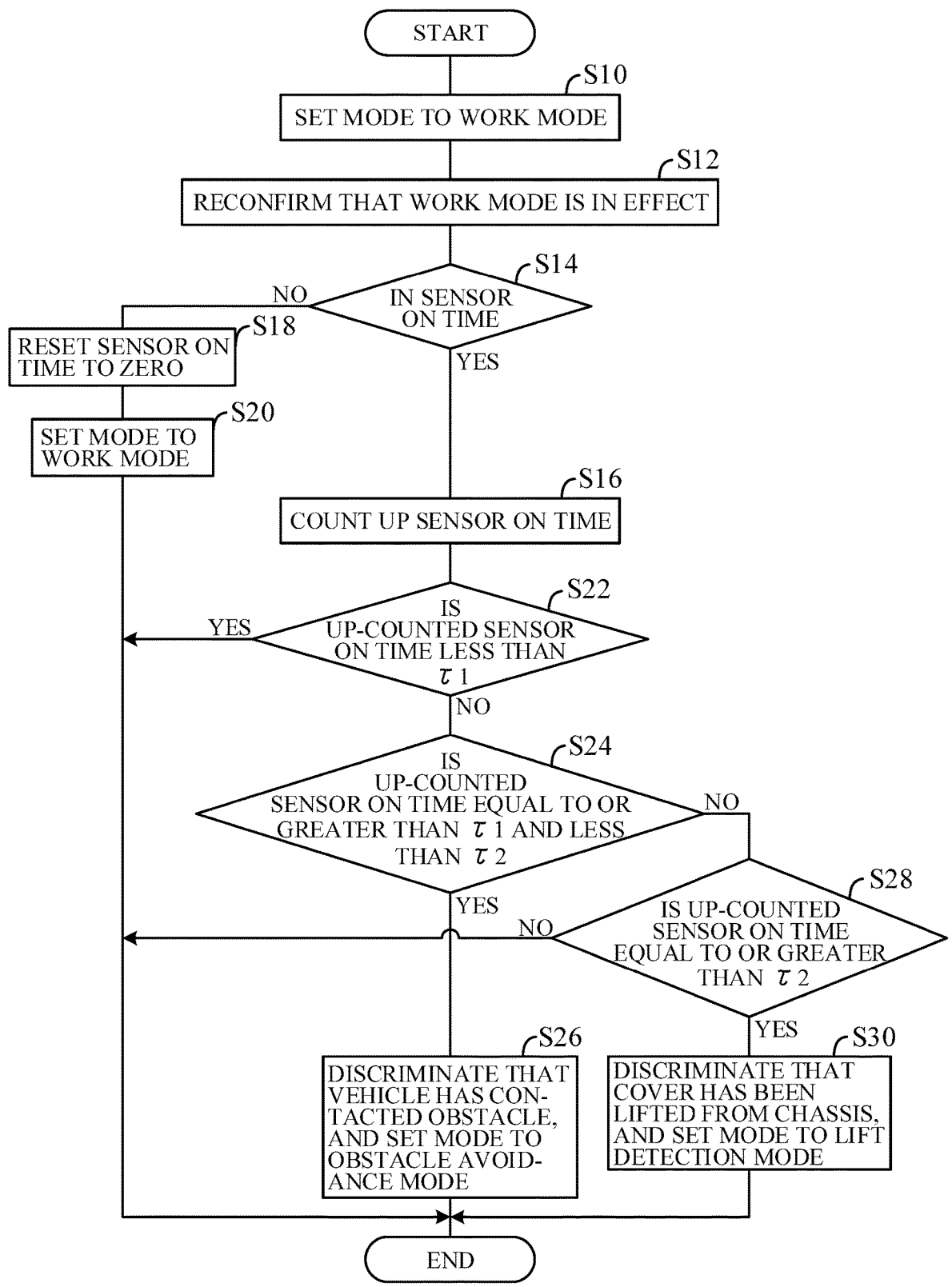
FIG. 5 is a flowchart showing operating procedure of an electronic control unit of FIG. 1.

FIG. 5 is a flowchart showing operating procedure of the ECU 44. The indicated program is executed in the ECU 44 at predetermined time periods, e.g., every τ0.

In S10 (S: processing Step), mode is set to work mode.

The vehicle 10 according to this embodiment operates either in work mode for performing lawn mowing in a working area AR recognized by using the magnetic sensors 36 to detect a magnetic field generated by application of electric current to the boundary wire 72 or in return mode for returning to the charging station 74 located in the working area AR to charge the onboard battery 32. In addition, as explained later, the vehicle 10 also has obstacle avoidance mode implemented upon discrimination of contact with an obstacle and lift detection mode implemented upon discrimination that the cover 12b was lifted.

Next, after reconfirming that work mode is in effect in S12, the program goes to S14 to determine whether in "sensor ON time". By "sensor ON time" is meant a state in which change in output of the contact-lift sensor 40 per prescribed time period is equal to or greater than a threshold value.

The point here is that since the vehicle 10 runs on uneven ground such as a lawn and is therefore constantly subject to vibration from the ground, external displacement-producing force continuously acts between the cover 12b and chassis 12a. Therefore, in order to eliminate such constant external force from consideration, change of sensor output per prescribed time period is determined in advance by testing and defined as the threshold value with which comparison is made.

When the result in S14 is YES, the program goes to S16, in which sensor ON time is counted up, and when NO, goes to S18, in which sensor ON time is reset to 0, and to S20, in which mode is set to working mode and ensuing processing skipped.

Also in the next and later program loops, when the program goes to S16 following an affirmative result in S14, it proceeds to S22 to determine whether up-counted sensor ON time is less than $\tau 1$ (first prescribed time period; $\tau 0 < \tau 1$). As the illustrated program is looped every $\tau 0$, sensor ON time is counted up by $\tau 0$ every time S16 is looped, but in the first loop the result is naturally YES and processing is terminated.

It should be noted that, when the program once goes to S16 to count up sensor ON time following a YES result in S14, if the result in S14 becomes NO in the next or later loop, all sensor ON time up-counted up to that time is cancelled (reset to 0) in S18.

Thus, sensor ON time means time period during which the cover 12b in the vehicle 10 is continuously subject to (continuously receives) displacement per prescribed time period relative to the chassis 12a of or greater than the threshold value.

When the result in S22 is YES, ensuing processing is skipped and the program is looped every $\tau 0$.

When the result in S22 becomes NO after a number of program loops, the program goes to S24 to determine whether sensor ON time is equal to or greater than $\tau 1$ (first prescribed time period) and less than $\tau 2$ (second prescribed time period; $\tau 0 < \tau 1 < \tau 2$). When the result in S24 is YES, the program goes to S26, in which the vehicle 10 is discriminated to have contacted an obstacle.

On the other hand, when the result in S24 is NO, the program goes to S28, in which it is determined whether sensor ON time is equal to or greater than $\tau 2$ (second prescribed time period).

When the result in S28 is NO, ensuing processing is skipped and the program is looped every $\tau 0$. On the other hand, when the result in S28 becomes YES after a number of program loops, the program goes to S30, in which the cover 12b is discriminated to have been lifted from the chassis 12a by the user, for example.

The reasoning here is that when the vehicle 10 contacts an obstacle, external force acting on the cover 12b is expected to be relatively short term, but when the cover 12b is lifted from the chassis 12a, the external force is expected to be relatively long term because the cover 12b is raised deliberately.

It is therefore possible by appropriately setting the first and second prescribed time periods $\tau 1$ and $\tau 2$ to effectively discriminate (detect) contact with an obstacle and lifting of the cover with a single type of (single unit) sensor.

Although the vehicle 10 is equipped with the work unit 20 (blade) connected to the output shaft of the work motor (prime mover) 22 mounted on the chassis 12a and obstacle avoidance mode might be entered upon determination of contact of the vehicle 10 with an obstacle in S26 at a time when the work motor 22 is operating, the mode is changed to the obstacle avoidance mode which is implemented to avoid the obstacle without stopping the work motor 22.

This is based on the assumption that risk of the vehicle 10 falling on its side or turning upside down simply by contact with an object is minimal, so that priority should advisably be placed on preventing more serious contact by, for example, backing up the vehicle 10. In the obstacle avoidance mode, therefore, avoidance operation taken while the work motor 22 is in operation is implemented while leaving it in operation so that avoidance operation can be quickly commenced.

On the other hand, when the cover 12b is discriminated in S30 to have been lifted from the chassis 12a and the lift detection mode is implemented, a measure for stopping the work motor 22 is taken. This is because the fact that the cover 12b has been lifted probably indicates that the user, for example, intends to transport the vehicle 10, so the work motor 22 is to be stopped.

As set out in the foregoing, this embodiment relates to the autonomously navigating vehicle 10 comprising the chassis 12a, the cover 12b displaceably attached to the chassis 12a, the sensor (contact-lift sensor) 40 configured to produce an output proportional to displacement between the chassis 12a and the cover 12b and the control unit (ECU) 44 configured to receives output of the contact-lift sensor 40, wherein the vehicle 10 is configured to navigate autonomously on drive wheels (rear wheels 16 driven by the propulsion motors 26) attached to the chassis 12a, characterized in that the control unit comprises a sensor output determination unit configured to determine whether change of the sensor output per prescribed time period is equal to or greater than the threshold value (S14), a time integration unit configured to count up time period during which change has been determined by the sensor output determination unit to be equal to or greater than the threshold value (S16), and a discrimination unit configured to compare time period counted up by the time integration unit with prescribed time periods (first prescribed time period and second prescribed time period) and discriminate whether the vehicle 10 has contacted an obstacle or whether the cover 12b has been lifted from the chassis 12a based on the result of the comparison with the prescribed time periods (S22 to S30), whereby contact with an obstacle and lift of the cover 12b can be detected with one type of sensor 40 and the configuration can be simplified compared with a configuration requiring two sensors.

Moreover, a configuration is adopted wherein the prescribed time periods comprise the first prescribed time period and the second prescribed time period that is longer than the first prescribed time period, and the discriminating unit discriminates that the vehicle has contacted an obstacle when the counted up time is equal to or greater than the first prescribed time period and less than the second prescribed time period (S24 and S26), while discriminates that the cover has been lifted when the counted up time is equal to or greater than the second prescribed time period (S28 and S30), whereby contact with an obstacle and lift of the cover 12b can be accurately detected with one type of sensor 40.

Further, a configuration is adopted that the vehicle 10 has the work unit (blade) 20 connected to the output shaft of the prime mover (work motor) 22 mounted on the chassis 12a and wherein, when discriminated that the vehicle 10 has contacted an obstacle, the discriminating unit implements operation to avoid the obstacle without stopping the prime mover, whereby, in addition to realizing the aforesaid effects, avoidance operation can be promptly implemented.

In addition, a configuration is adopted that the vehicle 10 has the work unit (blade) 20 connected to the output shaft of the prime mover (work motor) 22 mounted on the chassis 12a and wherein, when discriminated that the cover 12b has been lifted from the chassis 12a, the discriminating unit stops the prime mover, whereby, in addition to realizing the aforesaid effects, energy consumption can be saved.

Moreover, a configuration is adopted wherein the contact-lift sensor 40 comprises the magnetic body 40a installed near or in the vicinity of the cover 12b and the detection unit 40b having the magnetic sensitive element installed on the chassis 12a, and the sensor 40 is installed one on either side of a vehicle axis CL1 lying parallel to running direction of the vehicle 10, whereby, in addition to realizing the aforesaid effects, configuration can be simplified even as a single-type (single unit) sensor.

Although in the foregoing the vehicle 10 is exemplified as an autonomously navigating vehicle that navigates autonomously while detecting magnetic field of the boundary wire 72 laid around the working area AR, the vehicle 10 is not limited to this type of autonomously navigating vehicle.

Moreover, although the vehicle 10 is described as a lawn-mowing vehicle, this invention is not limited to such an application and can also be applied to other autonomously navigating vehicles capable of driving autonomously.

Further, although an electromagneto transducer, e.g., a Hall effect element, is used as the detection element of the detection unit 40b, this is not a restriction, and the detection element can be of any type insofar as capable of detecting physical displacement relative to the magnetic body 40a.

DESCRIPTION OF SYMBOLS 10 autonomously navigating vehicle (vehicle), 12 body, 12a chassis, 12b cover, 12b1 locking member, 14 front wheels, 16 rear wheels, 20 work unit (blade), 22 electric motor (work motor), 24 work unit height regulating mechanism, 26 electric motor (propulsion motor), 30 onboard charging unit, 32 onboard battery, 34 battery charging terminals, 36 magnetic sensors, 40 contact-lift sensor, 40a magnetic body, 40b detection unit, 40b1 screws, 40b2 case, 44 electronic control unit (ECU), 46 angular velocity sensor, 50 acceleration sensor, 52 direction sensor, 54 GPS sensor, 56 wheel speed sensor, 62 current sensor, 68 input device, 70 display, 72 boundary wire, 74 charging station, AR working area

The invention claimed is:

1. An autonomously navigating vehicle, which comprises:
a chassis;
a cover displaceably attached to the chassis;
a sensor configured to produce an output proportional to displacement between the chassis and the cover; and
a control unit configured to receives output of the sensor, wherein the vehicle is configured to navigate autonomously on drive wheels attached to the chassis, and wherein the control unit comprises:
a sensor output determination unit configured to determine whether change of the sensor output per prescribed time period is equal to or greater than a threshold value;
a time integration unit configured to count up time period during which change has been determined by the sensor output determination unit to be equal to or greater than the threshold value; and
a discrimination unit configured to compare time period counted up by the time integration unit with prescribed time periods and discriminate whether the vehicle has contacted an obstacle or whether the cover has been lifted from the chassis based on the result of the comparison with the prescribed time periods.

2. The vehicle according to claim 1, wherein the prescribed time periods comprise a first prescribed time period and a second prescribed time period that is longer than the first prescribed time period, and the discriminating unit discriminates that the vehicle has contacted an obstacle when the counted up time is equal to or greater than the first prescribed time period and less than the second prescribed time period, while discriminates that the cover has been lifted when the counted up time is equal to or greater than the second prescribed time period.

3. The vehicle according to claim 1, wherein the vehicle has a work unit connected to an output shaft of a prime mover mounted on the chassis, and when the discriminating unit discriminates that the vehicle has contacted an obstacle, the discriminating unit implements operation to avoid the obstacle without stopping the prime mover.

4. The vehicle according to claim 1, wherein the vehicle has a work unit connected to an output shaft of a prime mover mounted on the chassis, and when the discriminating unit discriminates that the cover has been lifted from the chassis, the discriminating unit stops the prime mover.

5. The vehicle according to claim 1, wherein the sensor comprises a magnetic body installed near the cover and a detection unit having a magnetic sensitive element installed on the chassis, and the sensor is installed one on either side of a vehicle axis lying parallel to running direction of the vehicle.

6. The vehicle according to claim 1, wherein the time integration unit resets the counted up time period to zero, when the change of the sensor output per prescribed time period is determined by the sensor output determination unit not to be equal to or greater than the threshold value.

7. The vehicle according to claim 3, wherein the work unit comprises a lawnmower blade.

8. An autonomously navigating vehicle, which comprises:
a chassis;
a cover displaceably attached to the chassis;
a sensor configured to produce an output proportional to displacement between the chassis and the cover; and
a control unit configured to receives output of the sensor, wherein the vehicle is configured to navigate autonomously on drive wheels attached to the chassis, and the control unit comprises a CPU and a memory coupled to the CPU, and
wherein the control unit is configured to:
determine whether change of the sensor output per prescribed time period is equal to or greater than a threshold value;
count up time period during which change has been determined by the sensor output determination unit to be equal to or greater than the threshold value; and compare time period counted up by the time integration unit with prescribed time periods and discriminate whether the vehicle has contacted an obstacle or whether the cover has been lifted from the chassis based on the result of the comparison with the prescribed time periods.

9. The vehicle according to claim 8, wherein the prescribed time periods comprise a first prescribed time period and a second prescribed time period that is longer than the first prescribed time period, and the control unit discriminates that the vehicle has contacted an obstacle when the counted up time is equal to or greater than the first prescribed time period and less than the second prescribed time period, while discriminates that the cover has been lifted when the counted up time is equal to or greater than the second prescribed time period.

10. The vehicle according to claim 8, wherein the vehicle has a work unit connected to an output shaft of a prime mover mounted on the chassis, and when discriminated that the vehicle has contacted an obstacle, the control unit implements operation to avoid the obstacle without stopping the prime mover.

11. The vehicle according to claim 8, wherein the vehicle has a work unit connected to an output shaft of a prime mover mounted on the chassis, and when discriminated that the cover has been lifted from the chassis, the control unit stops the prime mover.

12. The vehicle according to claim 8, wherein the sensor comprises a magnetic body installed near the cover and a detection unit having a magnetic sensitive element installed on the chassis, and the sensor is installed one on either side of a vehicle axis lying parallel to running direction of the vehicle.

13. The vehicle according to claim 8, wherein the time integration unit resets the counted up time period to zero, when the change of the sensor output per prescribed time period is determined not to be equal to or greater than the threshold value.

14. The vehicle according to claim 10, wherein the work unit comprises a lawnmower blade.

15. A method for detecting contact or lifting of an autonomously navigating vehicle, having a chassis, a cover displaceably attached to the chassis, and a sensor configured to produce an output proportional to displacement between the chassis, wherein the vehicle is configured to navigate autonomously on drive wheels attached to the chassis, the method comprising the steps of:

determining whether change of the sensor output per prescribed time period is equal to or greater than a threshold value;

counting up time period during which change has been determined by the sensor output determination unit to be equal to or greater than the threshold value; and comparing time period counted up by the time integration unit with prescribed time periods and discriminating whether the vehicle has contacted an obstacle or whether the cover has been lifted from the chassis based on the result of the comparison with the prescribed time periods.

16. The method according to claim 15, wherein the prescribed time periods comprise a first prescribed time period and a second prescribed time period that is longer than the first prescribed time period, and the step of discriminating discriminates that the vehicle has contacted an obstacle when the counted up time is equal to or greater than the first prescribed time period and less than the second prescribed time period, while discriminates that the cover has been lifted when the counted up time is equal to or greater than the second prescribed time period.

17. The method according to claim 15, wherein the vehicle has a work unit connected to an output shaft of a prime mover mounted on the chassis, and when discriminated that the vehicle has contacted an obstacle, the step of discriminating implements operation to avoid the obstacle without stopping the prime mover.

18. The method according to claim 15, wherein the vehicle has a work unit connected to an output shaft of a prime mover mounted on the chassis, and when discriminated that the cover has been lifted from the chassis, the step of discriminating stops the prime mover.

19. The method according to claim 15, wherein the sensor comprises a magnetic body installed near the cover and a detection unit having a magnetic sensitive element installed on the chassis, and the sensor is installed one on either side of a vehicle axis lying parallel to running direction of the vehicle.

20. The method according to claim 15, wherein the step of time integrating resets the counted up time period to zero, when the change of the sensor output per prescribed time period is determined by the step of sensor output determining not to be equal to or greater than the threshold value.

* * * * *